W. O. STODDARD.
Apparatus for Desiccating Egg-Batter.
No. 167,801. Patented Sept. 14, 1875.
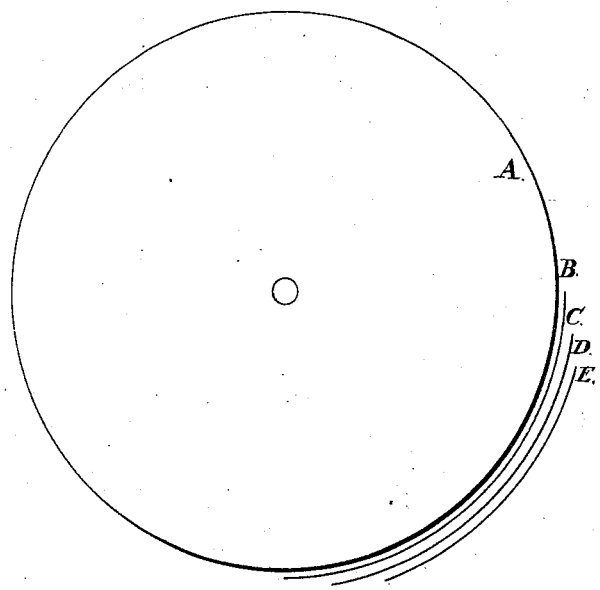
Attest:
Inventor.
William Osborn Stoddard

UNITED STATES PATENT OFFICE.

WILLIAM OSBORN STODDARD, OF NEW YORK, N. Y.

IMPROVEMENT IN APPARATUS FOR DESICCATING EGG-BATTER.

Specification forming part of Letters Patent No. 167,801, dated September 14, 1875; application filed May 31, 1875.

*To all whom it may concern:*

Be it known that I, WILLIAM OSBORN STODDARD, of the city of New York, in the county of New York and State of New York, have invented a new and useful improvement in machinery used for the purpose of drying or desiccating batter of eggs, composed of the yolks and whites of eggs beaten together, or albumen of eggs, which improvement is fully set forth in the following specification, reference being had to the accompanying drawing.

The object of my invention is to prepare a perfected super-surface for the face or faces of any plates, disks, or other sub-surfaces, as A, Figure 1, of any design or form, used in the drying or desiccating of batter of eggs or albumen, by the formation, upon the sub-surface A, of a sufficiently strong and adhesive dry film or stratum, as B, Fig. 1, of the material itself—for instance, batter of eggs, afterward to be dried or desiccated thereon.

To obtain such a super-surface as is required for the purposes of this invention, the sub-surface, as A, Fig. 1, of whatever form or design employed, should be composed of such a substance as, first, hard, non-resinous, unodoriferous wood, as seasoned hickory, so cut that the preparation indicated may be made on the grain; or, second, fine-grained natural stone; or, third, a compound of cement and pulverized slate or silex, or other common and well-known artificial stone; or, fourth, of fine-grained unglazed fire-brick, as will, without softening or decomposition, absorb a portion of the batter of eggs, and secure the close and more or less permanent adhesion of a strong film thereof; or, fifth, of such metals, or common and well-known compounds of metals, or prepared or galvanized metals, as will not form a chemical combination with the batter of eggs, or with any constituent part thereof, and will at the same time present a sufficient affinity therewith to secure the required adhesion of the film or super-surface against any ordinary or necessary force employed in removing the subsequent films or layers of dried or desiccated or crystallized material.

Sub-surfaces of iron or steel, ungalvanized, or not similarly protected, will not answer the purposes of this invention, by reason of the affinity of the iron for the sulphur of the egg, the consequent combination discoloring and deteriorating the product.

Several varieties of natural slate make a very good sub-surface, after prolonged daily submersion, for a period of from four to six weeks, at a temperature of about 130° Fahrenheit, in batter of eggs.

Galvanized iron receives a very adhesive film, but should be frequently cleansed, and should be renewed on the first signs of wear or corrosion. Other substances, practically experimented with, show a wide range of adaptability.

The value of this invention is as follows: That, by the use of such a super-surface as is herein described, the batter of eggs or albumen in process of being dried or desiccated is kept from all contact with any foreign substance, and is preserved absolutely pure; that the said super-surface will receive and retain several successive layers of the material to be dried, one over the other, each successive layer being thicker, or more perfectly formed for the uses thereof, and more rapidly dried or desiccated than any single layer of the same material imposed, in like manner, directly upon any surface not prepared in this manner, and composed of any substance known to me; that by this means it is possible to employ, for the purposes indicated, a wide variety of light and cheap substances as sub-surfaces to receive the super-surface herein described, dispensing with weighty and costly material, (as, for instance, natural slate,) and so permitting, at the same time, a more rapid and less costly mode of manufacture, with the use of lighter machinery and less wear and tear thereof.

A proper sub-surface being given, the super-surface thus prepared will not be removed or seriously abraded by any ordinary or necessary force employed in removing the product, as the latter is more easily detached, when perfected, from this prepared super-surface than from any other known to me.

I claim as my invention—

1. A film of dried batter of eggs, in combination with the base to which it is applied and adheres, in order to receive a layer or layers of moist batter of eggs to be desiccated, substantially as described.

2. The combination, with a base having a surface of non-resinous, unodoriferous wood, stone, slate, or other specified material, having the characteristic set forth of an adhering film of dried batter of eggs, substantially as described.

WILLIAM OSBORN STODDARD.

Witnesses:
OTHO H. KLEMM,
GEO. W. STERRITT.